E. J. MOORE.
AIR CONTROLLED FEED SYSTEM FOR LIQUIDS.
APPLICATION FILED OCT. 7, 1908.
960,986.
Patented June 7, 1910.
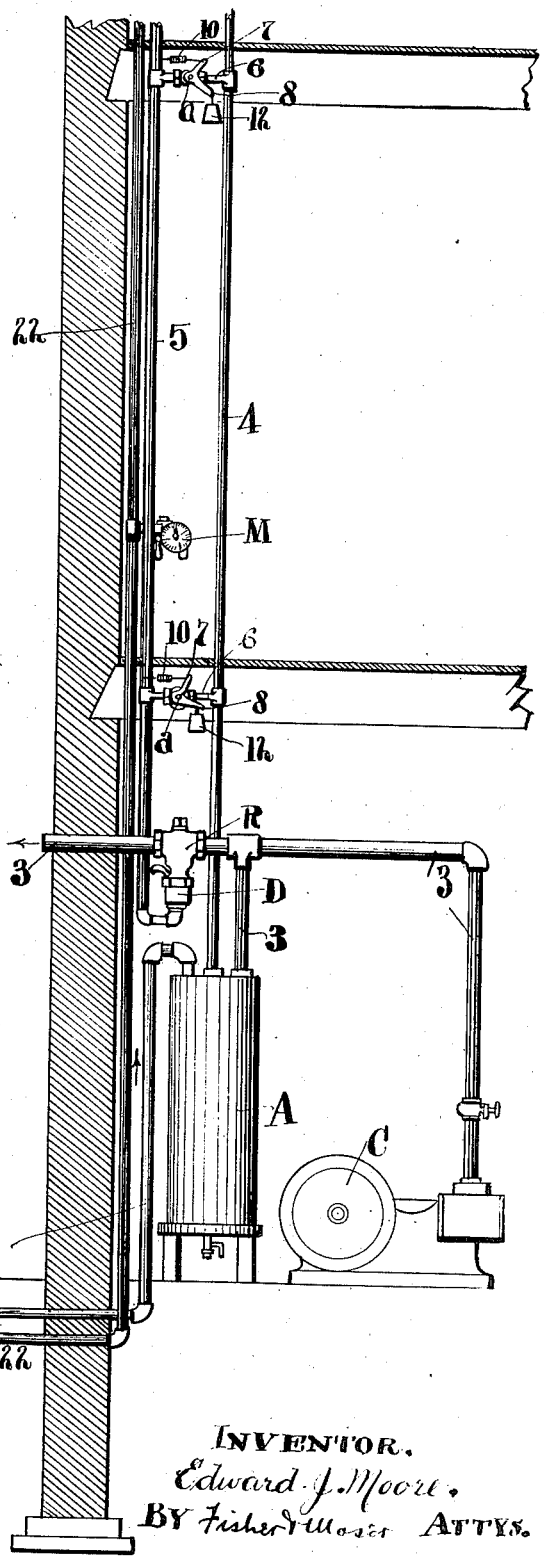
Fig. 1.
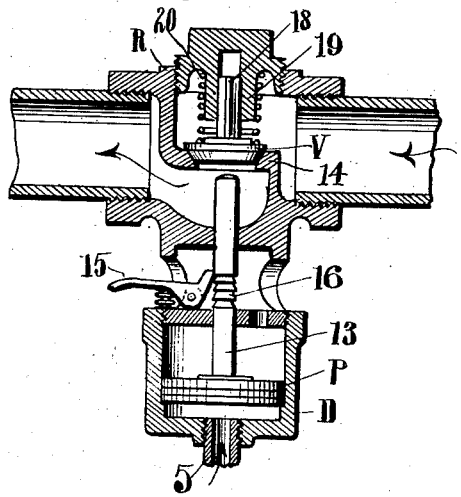
Fig. 2.
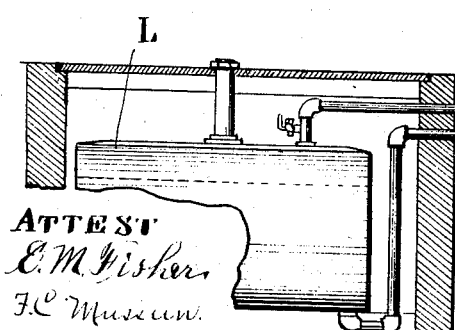
ATTEST
E. M. Fisher
F. C. Mussun
INVENTOR.
Edward J. Moore.
BY Fisher & Moser ATTYS.

UNITED STATES PATENT OFFICE.

EDWARD J. MOORE, OF CLEVELAND, OHIO, ASSIGNOR TO S. F. BOWSER & COMPANY, INC., OF FORT WAYNE, INDIANA.

AIR-CONTROLLED FEED SYSTEM FOR LIQUIDS.

960,986.     Specification of Letters Patent.     Patented June 7, 1910.

Application filed October 7, 1908. Serial No. 456,682.

*To all whom it may concern:*

Be it known that I, EDWARD J. MOORE, a citizen of the United States, residing at Cleveland, in the county of Cuyahoga and State of Ohio, have invented certain new and useful Improvements in Air-Controlled Feed Systems for Liquids, and do declare that the following is a full, clear, and exact description of the invention, which will enable others skilled in the art to which it appertains to make and use the same.

My invention relates to an air controlled feed system for liquids, like oils in paint, varnish, and other plants where liquids are distributed from a given source under pressure through lines of pipes to different elevations and wherein it is desirable that the liquid should be drained back to the source when the plant is shut down for the night or in case of fire, the return being by gravity when the requisite vent has been supplied.

In the accompanying drawings, Figure 1 is a side elevation of a plant or outfit complete, and Fig. 2 is an enlarged sectional elevation of a relief valve mechanism for the compressed air, and Fig. 3 is a sectional elevation of the vent mechanism.

Heretofore it has been a common practice to employ electrical devices in apparatus of this kind to open the vents to the oil pipes or channels, but underwriters have seriously objected to such devices as being very dangerous on account of the presence of inflammable oils and the consequent danger of fires, and hence it has been difficult to get the desired insurance at rates that seemed reasonable. Hence I have eliminated all electrical contrivances from the plant and introduced a system of atmospheric relief, as will now appear. To these ends, the plant comprises a suitable liquid tank L, adapted to contain the oil or other liquid under requisite air pressure from pump or compressor C, which delivers the air to said tank through intervening air tank A and connecting pipes $a$ and $c$ respectively.

R represents a relief valve mechanism in relief pipe $c$ which opens to both tanks A and L to relieve pressure therein when draining of the supply pipes becomes desirable, and which mechanism is automatically operated in case of fire but not otherwise. That is to say, when the plant is shut down and the pipes are drained purposely the relief valve mechanism is not operated and the engineer blows off the pressure through any convenient valved or other outlet. In this case vent for the supply pipes is otherwise provided as will presently be seen. Following this automatic vent to its details we have, first, the air pressure pipe 4 from the top of air tank A, and a return pipe 5 terminating at its bottom in a piston chamber D beneath relief valve coupling R and in operating relations therewith. Pipe 4 is in open communication with oil tank L through pipe 2, and communicates with air exhaust pipe 5 by cross pipes 6 at intervals. In these cross pipes I arrange initial rotatable valves $a$ or their equivalent, adapted to open and close said pipes according to the position of the valves therein, and said valves $a$ are normally closed, as shown. Each valve is provided with arms 7 and 8, or their equivalent, and a fusible connection 10 engages with arm or projection 7 and pipe 5 and holds the valve shut. A weight 12 is attached to arm 8 and opens the valve when fuse 10 is melted or otherwise broken. The fusible connection 10 can be made to yield at any abnormal temperature, and its sensitiveness is fixed according to local conditions. When a valve $a$ is opened air will pass from pipe 4 to pipe 5 and thence down into piston chamber D beneath piston P. Said piston carries a rod 13 which projects through the top of said chamber into valve coupling R beneath valve V and lifts said valve from its seat 14, thus giving a free and direct escape for the compressed air from all the tanks and spaces open thereto. A pivoted pawl 15 on the top of piston chambers D is adapted to engage annular shoulders 16 on stem or rod 13 and hold valve V open when it has been raised from its seat. Said valve has a stem 18 and guide 19 therefor and is held on its seat by spring 20, but any equivalent of this valve construction may be adopted.

The foregoing mechanism relates to the automatic relief of air pressure on the system, but when this is done it still remains to provide vent for the oil pipes 22, so that they will drain freely and promptly to liquid tank L. One or another style or kind of vent may be provided, but I have coupled the vent in this case with the meter or measuring devices shown and described in my pending application, Serial No. 414,837, and a casing M represents the same as attached to pipe 22 on the different floors of the building and serving to draw off the oil or liquid as wanted.

What I claim is:—

1. A liquid tank and a distributing pipe therefrom having an air vent, means to maintain air pressure in said tank and means to automatically relieve said pressure comprising an exhaust valve for the air, an initial valve normally closed and means adapted to open said exhaust valve when said initial valve has been opened.

2. A liquid tank and an air pressure connection therefor comprising a storage tank and an exhaust pipe open thereto, an outgoing pipe and a return pipe connected with said exhaust and storage tank respectively, connections between said pipes at intervals and automatically controlled valves in said connections normally closed, in combination with an exhaust valve for the air in said exhaust pipe and a piston operatively engaged therewith and adapted to open said valve when one of said automatically controlled valves has been opened.

In testimony whereof I sign this specification in the presence of two witnesses.

EDWARD J. MOORE.

Witnesses:
E. M. FISHER,
F. C. MUSSUN.